US010564741B2

(12) United States Patent
Dekel

(10) Patent No.: US 10,564,741 B2
(45) Date of Patent: Feb. 18, 2020

(54) ACTIVE STYLUS PAIRING WITH A DIGITIZER

(71) Applicant: Microsoft Technology Licensing, LLC, Redmond, WA (US)

(72) Inventor: Shoham Dekel, Tel-Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 188 days.

(21) Appl. No.: 15/787,729

(22) Filed: Oct. 19, 2017

(65) Prior Publication Data
US 2019/0121453 A1    Apr. 25, 2019

(51) Int. Cl.
*G06F 3/038*    (2013.01)
*G06F 3/0354*   (2013.01)
*G06F 3/044*    (2006.01)
*G06F 3/041*    (2006.01)

(52) U.S. Cl.
CPC ........ *G06F 3/0383* (2013.01); *G06F 3/03545* (2013.01); *G06F 3/044* (2013.01); *G06F 3/0416* (2013.01); *G06F 2203/0384* (2013.01)

(58) Field of Classification Search
CPC ......... G06F 2203/0384; G06F 3/03545; G06F 3/0383; G06F 3/041; G06F 3/0412; G06F 3/0416; G06F 3/044
USPC .............. 455/39, 418, 41.1, 41.2; 178/18.01, 178/18.03, 19.02; 345/173, 179, 442; 709/224; 382/317
See application file for complete search history.

(56) References Cited

U.S. PATENT DOCUMENTS

| 5,764,818 A * | 6/1998 | Capps ................. G06F 15/0283 382/317 |
| 6,148,338 A * | 11/2000 | Lachelt ............... H04L 41/0213 709/224 |
| 8,723,820 B1 * | 5/2014 | Han ....................... G06F 3/016 178/18.01 |
| 9,164,618 B2 | 10/2015 | Perski et al. |
| 9,189,084 B2 | 11/2015 | Hicks et al. |
| 9,239,639 B1 * | 1/2016 | Vanderet .............. G06F 3/03545 |

(Continued)

FOREIGN PATENT DOCUMENTS

| EP | 2388770 | 11/2011 |
| WO | 2014061020 A1 | 4/2014 |

OTHER PUBLICATIONS

USI "Enabling a Universal Stylus", USI Universal Stylus Initiative, MyScript Conference, San Jose, CA, USA, Oct. 19, 2015, Slide-Show, 32 P., Oct. 19, 2015.

(Continued)

*Primary Examiner* — Tan H Trinh

(57) ABSTRACT

A method includes storing a log of pairing events between the stylus and each of a plurality of digitizer systems from which the stylus is configured to receive input and defining a search protocol to identify which digitizer system from the plurality of digitizer systems is providing input to the stylus based on the log. The method also includes searching for the digitizer system that is communicating with the stylus based the input detected and transmitting signals from an interacting tip of the stylus using a protocol configured for communicating with the digitizer system identified during the searching. The log of pairing events is stored while a user is operating a stylus and the search protocol is dynamically defined based on the log.

20 Claims, 7 Drawing Sheets

(56) References Cited

U.S. PATENT DOCUMENTS

| | | | |
|---|---|---|---|
| 9,292,116 B2 * | 3/2016 | Mann | G06F 3/041 |
| 10,268,273 B1 * | 4/2019 | Sundaram | G06F 3/016 |
| 10,268,288 B1 * | 4/2019 | Wang | G06F 3/0383 |
| 2004/0036681 A1 * | 2/2004 | Kluttz | G06F 3/041 |
| | | | 345/173 |
| 2006/0012581 A1 * | 1/2006 | Haim | G06F 3/041 |
| | | | 345/173 |
| 2008/0169132 A1 | 7/2008 | Ding et al. | |
| 2009/0078476 A1 * | 3/2009 | Rimon | G06F 3/03545 |
| | | | 178/18.03 |
| 2010/0321338 A1 | 12/2010 | Ely | |
| 2014/0043245 A1 * | 2/2014 | Dowd | G06F 3/04883 |
| | | | 345/173 |
| 2014/0085269 A1 * | 3/2014 | Armstrong-Muntner | G02F 1/1333 |
| | | | 345/179 |
| 2014/0104224 A1 * | 4/2014 | Ih | G06F 3/044 |
| | | | 345/174 |
| 2014/0253467 A1 * | 9/2014 | Hicks | G06F 3/033 |
| | | | 345/173 |
| 2015/0050879 A1 * | 2/2015 | MacDuff | H04W 12/06 |
| | | | 455/39 |
| 2015/0277587 A1 * | 10/2015 | Chandran | G06F 3/0416 |
| | | | 345/173 |
| 2015/0363067 A1 * | 12/2015 | Winebrand | G06F 3/0416 |
| | | | 345/173 |
| 2015/0371417 A1 * | 12/2015 | Angelov | G06Q 10/101 |
| | | | 345/442 |
| 2016/0062464 A1 * | 3/2016 | Moussette | G08B 6/00 |
| | | | 345/173 |
| 2016/0162118 A1 | 6/2016 | Gur et al. | |
| 2016/0179222 A1 * | 6/2016 | Chang | G06F 3/03545 |
| | | | 345/179 |
| 2016/0195943 A1 | 7/2016 | Gur et al. | |
| 2016/0209940 A1 | 7/2016 | Geller et al. | |
| 2016/0337496 A1 * | 11/2016 | Jeganathan | H04M 1/7253 |
| 2017/0003767 A1 * | 1/2017 | Holsen | G06F 3/0383 |
| 2017/0097695 A1 | 4/2017 | Ribeiro et al. | |
| 2017/0249028 A1 * | 8/2017 | Marshall | G06F 3/03545 |
| 2017/0262084 A1 | 9/2017 | Qiao | |
| 2018/0024658 A1 * | 1/2018 | Yamamoto | G06F 3/03545 |
| | | | 345/179 |
| 2018/0129311 A1 * | 5/2018 | Westhues | G06F 3/0442 |
| 2018/0293081 A1 * | 10/2018 | Trethewey | G06F 1/1626 |
| 2019/0064936 A1 * | 2/2019 | Wang | G06F 3/038 |
| 2019/0155411 A1 * | 5/2019 | Kinrot | G06F 3/0304 |

OTHER PUBLICATIONS

USI "USI: The Industry Standard Active Stylus Solution", YouTube Presentation, 3 P., Jan. 3, 2017.

"International Search Report and Written Opinion Issued in PCT Application No. PCT/US2018/055528", dated Mar. 22, 2019, 15 Pages.

* cited by examiner

ACTIVE STYLUS PAIRING WITH A DIGITIZER

BACKGROUND

Signal emitting styluses, e.g. active styluses are known in the art for use with a digitizer system. The digitizer system detects position of the stylus based on the signal emitted and the detected positions provide input to a computing device associated with the digitizer system. The detected position are then interpreted as user commands. Often, the digitizer system is integrated with a display screen, e.g. to form a touch screen. Positions of the stylus over the screen are correlated with virtual information portrayed on the screen. The signal emitted by the stylus may include information such as pressure applied on the writing tip and stylus identification. The information is decoded by the digitizer system.

Digitizer systems that track signals emitted by the stylus also typically track input provided with a finger or conductive object. The stylus and the conductive object are typically sensed over separate sampling periods. Example methods of sensing a finger or a conductive object include a mutual capacitive detection method and a self capacitive detection method.

SUMMARY

The disclosure in some embodiments relates to an active stylus that is compatible with plurality of touch-enabled devices, each configured to receive input with a different communication protocol or configuration. The plurality of touch-enabled devices may include different types of devices, e.g. a smart phone, a personal computer and a smart television and may include different versions or makes of a same type of device. In some example embodiments, a user may use the stylus to communicate with any one of the plurality of touch-enabled devices and may seamlessly switch between the devices.

According to an aspect of some embodiments, a search protocol to detect the digitizer system with which a stylus is interacting is provided. The search protocol may search for each of a plurality of possible digitizer systems. Search protocol timings and timeout for each digitizer system may be dynamically updated based on a computed probability that the digitizer system is communicating with the stylus. Dynamically updating the search protocol as described herein may be useful in reducing power expenditure and processing time of the stylus while maintaining an ability of the stylus to seamless switch between communicating with a plurality of different devices. While seamlessly switching between communicating with a plurality of different devices the user may not be required to prompt the stylus to switch protocols or configurations. The switching may be performed automatically without user intervention.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, example methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

According to aspects of some embodiments of the present disclosure, a stylus accumulates data related to previous activity of the stylus with different touch enabled computing devices and defines a search protocol for identifying the device that is presently communicating with the stylus based on the data accumulated. The data accumulated may be a log of previous pairing events. Optionally, the data accumulated may include information identifying which touch enabled computing devices a user owns or uses. A probability of identifying each of the plurality of devices may be computed and the search protocol may be defined based on the computed probabilities. The search protocol may define a frequency and duration over which the stylus searches for each of the plurality touch enabled devices that can communicate with the stylus based on the computed probabilities. For example, the stylus may search often for a device that the stylus encounters often and may search less often for a device that is rarely encountered by the stylus or has never been encountered. The search protocol is dynamically adjusted as new data is accumulated. A benefit in high frequency and long duration searching is quick pairing of the stylus to a digitizer system. A cost of high frequency and long duration searching is in power expenditure and processing time. In some example embodiments, the probability determined is applied to find a suitable balance between these costs and benefits while searching.

In some example embodiments, pairing is based on a stylus periodically transmitting one or more uplink requests and detecting an uplink signal based on the requests. The uplink requests transmitted by the stylus may be device specific and the stylus may consecutively transmit a plurality of different uplink requests during a search. Alternatively, an uplink request may be generic to more than one device. The uplink request may also be the signal that is used by the digitizer system to track the stylus position. In some example embodiments, processing of the received uplink signal may be device specific, e.g. different processing may be applied to identify different devices. According to embodiments of the present disclosure, a frequency that a device specific uplink request is transmitted and a duration over which a corresponding device specific processing occurs may be adjusted based on a determined probability that stylus is communicating with that device.

Figure 1A:
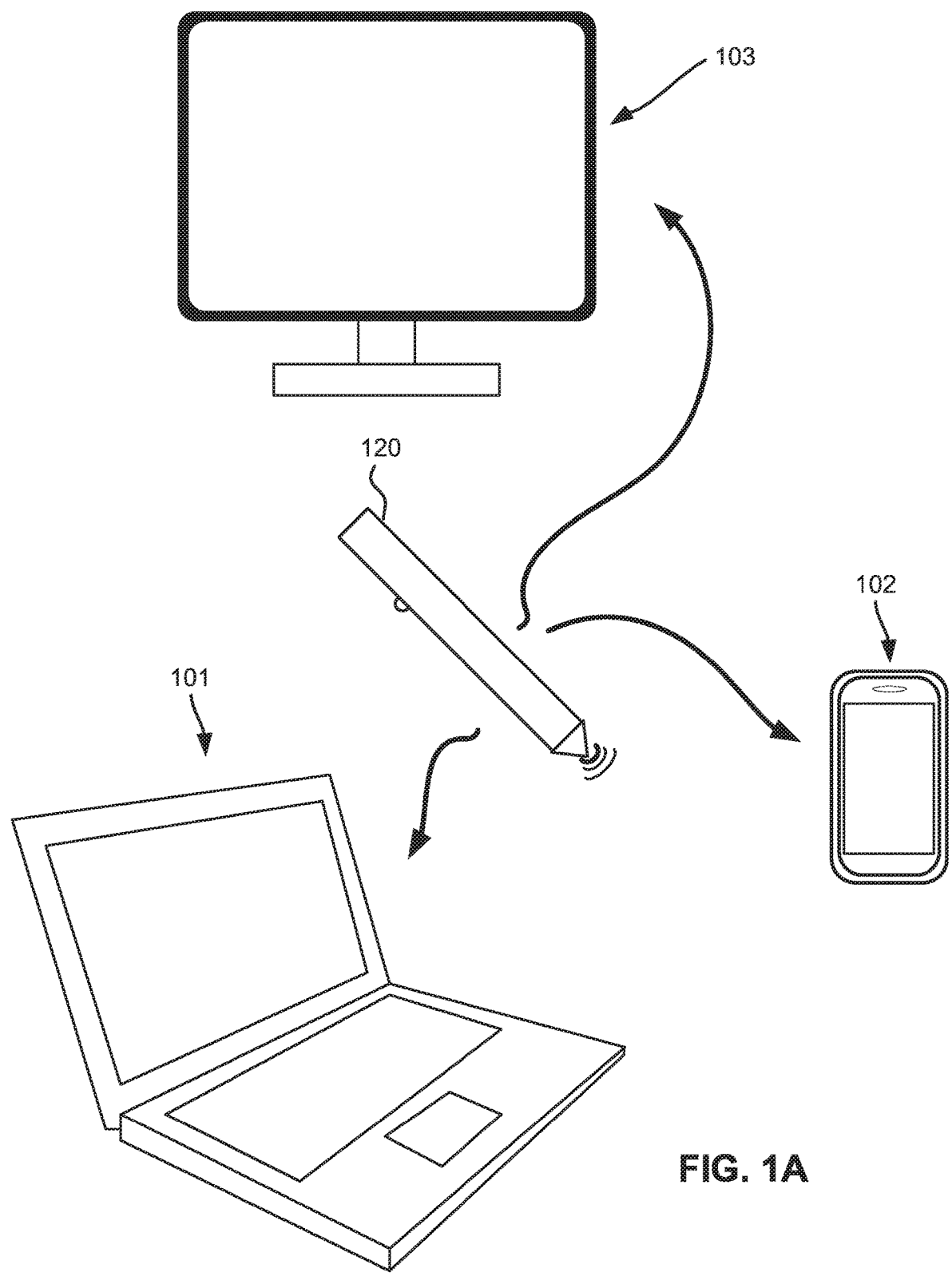
FIGS. 1A and 1B are example representations of a stylus being used to interact with a plurality of touch enabled computing devices.
Figure 1B:
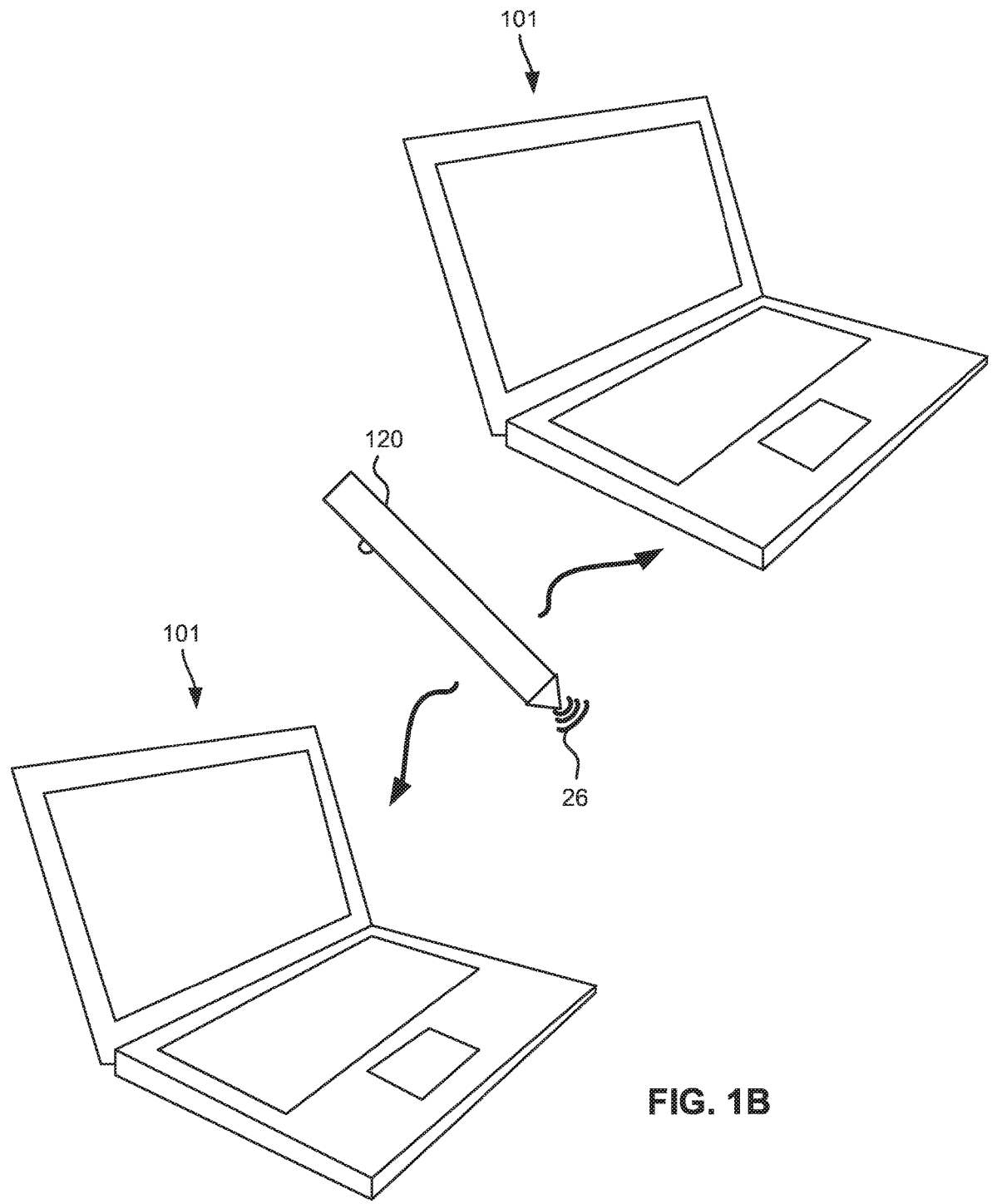

Reference is now made to FIGS. 1A and 1B showing example representations of a stylus being used to interact with a plurality of touch enabled computing devices. In some examples as shown in FIG. 1A, a stylus 120 is configured to interact with a plurality of different types of touch enabled devices. For example, stylus 120 may interact with a laptop 101, a smart telephone 102 and a smart television 103. A user may seamless switch between using stylus 120 to operate any one of laptop 101, smart telephone 102 and smart television 103. During seamless switching the user does not need to actively prompt the stylus, e.g. does not need to press any buttons on the stylus to switch configuration.

Each of the different devices may require a different communication protocol due to size of its touch screen, resolution of its touch screen, make of its touch screen and functions that may be performed. During operation, stylus 120 periodically searches for each of a plurality of known communication protocols so that a user may seamlessly switch between each of the different devices with stylus 120.

In additional examples as shown in FIG. 1B, a user may seamless switch between using stylus 120 to operate more than one of the same type of touch enabled computing device 101. In some examples, each of the devices 101 may require a different communication protocol due to make of its touch screen and stylus 120 may be configured to search for the different communication configurations. In other examples, each of devices 101 may communicate with a same communication protocol but since devices 101 are not synchronized, stylus 120 may need to update synchronization based on a user switching between interacting with more than one device 101.

Stylus 120 may programmed to search for each of a plurality of digitizer systems with which stylus 120 is configured to communicate. Continuously searching for a plurality of digitizer systems may consume a significant amount of power as well as processing time. In some example embodiments, a search protocol is defined in which stylus 120 may seamless switch between interacting with a plurality of digitizer systems with reduced power expenditure and reduced processing. In some example embodiments, the search protocol is defined to invest more resources in searching for digitizer systems that are more likely to be used with stylus 120 and less resources in searching for digitizer systems that are not likely to be used with stylus 120. Probability of pairing with a particular digitizer system may be defined based on a log of past pairing events, stored user preferences and host commands. Optionally, the search protocol is defined so that devices that are more likely to be used with stylus 120 may be detected faster while devices that are less likely to be used with stylus 120 may be detected with an acceptable lag. The search protocol may be dynamically updated to take into account new data as it is collected.

Figure 2:
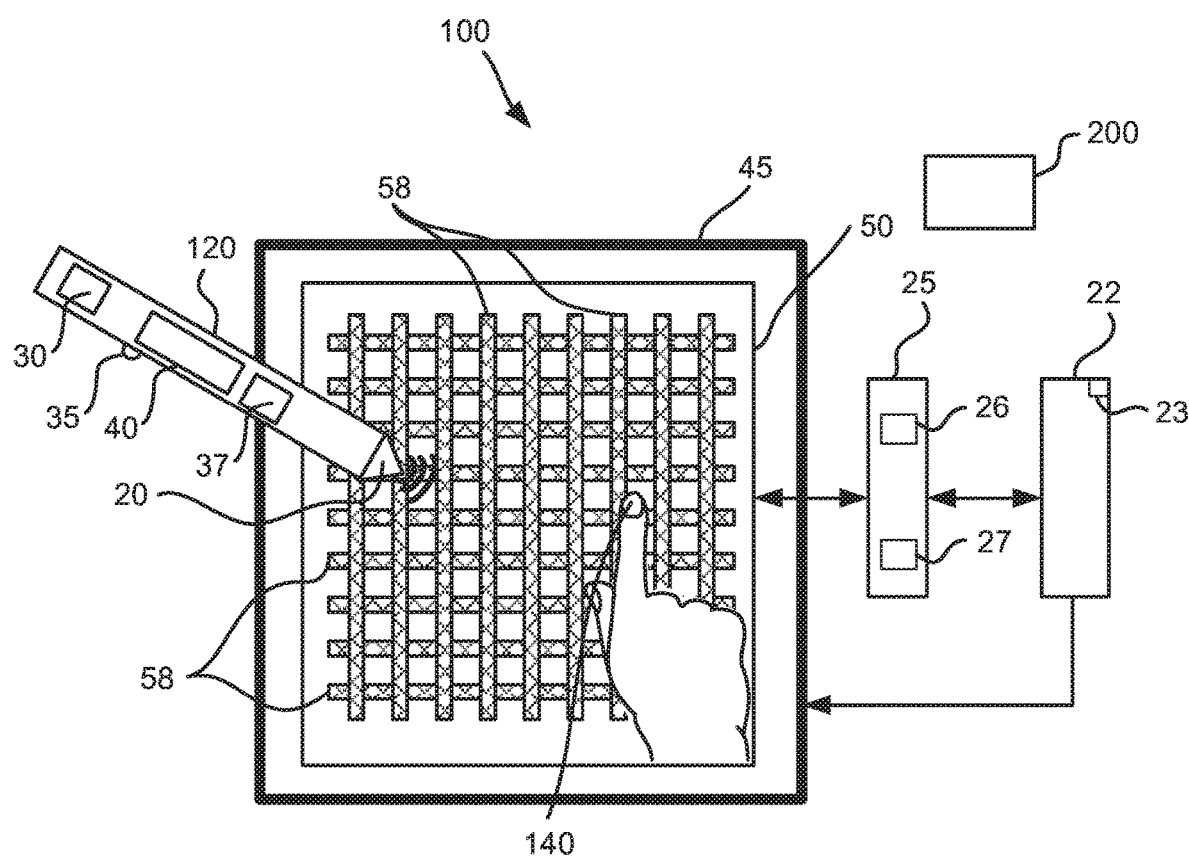
FIG. 2 is a simplified block diagram of an example touch enabled computing device.

Reference is now made to FIG. 2 showing a simplified block diagram of an example touch enabled computing device in accordance with some embodiments of the present disclosure. A touch enabled computing device 100 includes a display 45 integrated with a digitizer sensor 50. Integration may be based on digitizer sensor 50 overlaid on a Flat Panel Display (FPD), may be based on digitizer sensor 50 integrated on a protective glass layer of the FPD (on-cell technology) or may be based on digitizer sensor 50 integrated as part of the display panel of the FPD (in-cell technology).

Digitizer sensor 50 may be a grid based capacitive sensor formed with row and column conductive strips 58 forming grid lines of the grid based sensor.

Alternatively, digitizer sensor is formed with a matrix of electrode junctions not necessarily constructed based on row and column conductive strips.

In some examples, digitizer sensor 50 with digitizer circuit 25 detects touch of one or more fingertips 140 or other conductive objects as well as input by stylus 120 transmitting an electromagnetic signal typically via the writing tip 20 of stylus 120. As used herein, the term digitizer system refers to digitizer sensor 50 with digitizer circuit 25.

Digitizer circuit 25 may apply mutual capacitance detection or a self-capacitance for sensing a touch signal from touch (or hover) of fingertip 140. During mutual capacitance and self-capacitance detection, digitizer circuit 25 sends a triggering signal, e.g. pulse to one or more conductive strips 58 of digitizer sensor 50 and samples output from conductive strips 58 in response to the triggering. Coordinates of fingertip 140 may be computed by digitizer circuit 25 or by host 22 from the sampled output. The triggering signal may also be used by stylus 120 as an uplink signal based on which stylus 120 identifies the digitizer system and synchronizes with its detection periods. Alternatively, digitizer circuit 25 generates a dedicated signal on one or more conductive strips 58 for communication with stylus 120.

Stylus 120 may communicate via tip 20 with digitizer sensor 50 by transmitting a signal at a defined repeat rate, e.g. every 5-20 msec. A frame is typically the basic unit in which a stylus transmits information. Each frame may include a position signal (or beacon) and a train of data defining a plurality of parameters that may be directly related to stylus 120, related to an environment around the stylus 120, to a user using stylus 120, to privileges allotted to the stylus 120, capabilities of stylus 120, or information received from a third party device. Information related to the stylus may include indications of a pressed button(s) 35, pressure level on tip 20 as detected by a sensor 37 included in stylus 120, tilt, identification, manufacturer, version, media access control (MAC) address, and stored configurations such as color, tip type, brush, and add-ons. In some example embodiments, one or more of the position signal and the train of data may be configured differently for different computing devices.

In some example embodiments, touch enabled computing device 100 synchronizes with the stylus frame based on detecting the position signal. In alternate embodiments, stylus 120 synchronizes with detection periods of computing device 100 based on receiving the uplink signal from the digitizer system.

Stylus 120 may include an ASIC 40 that controls operation of stylus 120. ASIC 40 may generate the position signal (or beacon) and train of data emitted by stylus 120. ASIC 40 may also be configured to process and store input detected via tip 20 or via an auxiliary wireless communication unit 30 from which stylus 120 may communicate with device 100. Communication unit 30 may be a channel with Bluetooth communication, near field communication (NFC), radio frequency (RF) communication using a module 23 of host 22.

ASIC 40 may accumulate data related to past pairing events of stylus 120 with various digitizer systems and update a stored search protocol based on the accumulated information.

Digitizer circuit 25 samples output from conductive strips 58 to detect stylus signals pick up by digitizer sensor 50. Coordinates of stylus 120 and data transmitted by stylus 120 may be determined from the signals picked up by digitizer sensor 50. In some examples, digitizer circuit 25 manages pairing with stylus 120. Alternatively, module 23 of host 22 handles pairing with stylus 120. Modulate 23 may use Bluetooth communication, near field communication (NFC), or radio frequency (RF) communication to air with stylus 120. In some example embodiments, host 22 or circuit 25 instructs stylus 120 to update or configure its transmission protocol based on analysis and reports from circuit 25 and host 22.

Processing of the stylus signal may be with digitizer circuit 25 or with host 22. Stylus detection may be performed over a defined time window in the refresh cycle of the digitizer system that may be separate from a time window applied for finger touch detection.

Output from digitizer circuit 25 is reported to host 22. The output provided to host 22 may include coordinates of one or more fingertips 140, coordinates of writing tip 20 of stylus 120 and additional information provided by stylus 120, e.g. pressure, tilt, and battery level. Host 22 may transmit the information to an application manager or a relevant application.

Figure 3:
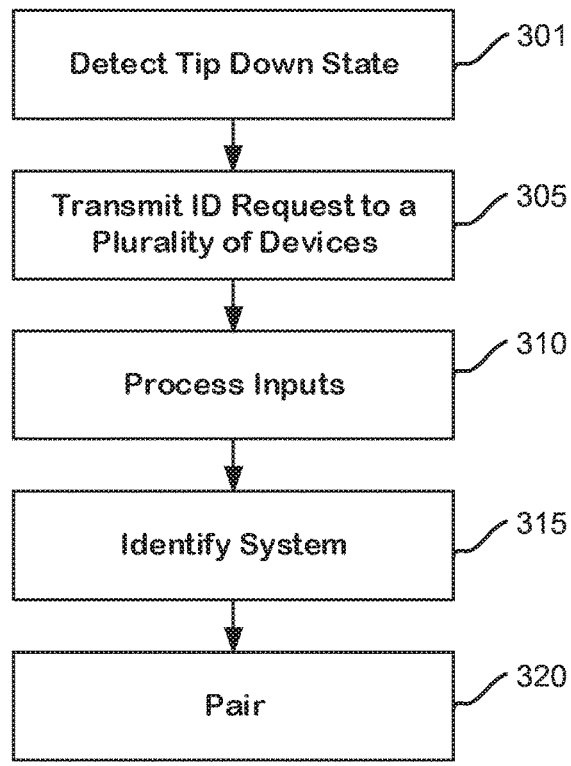
FIG. 3 is a simplified flow chart of an example method for a stylus to pair with a digitizer system.

Reference is now made to FIG. 3 showing a simplified flow chart of an example method for a stylus to pair with a digitizer system. A stylus may initiate a search mode based on detecting a touch state of its writing tip (a tip down state) (block 301). Alternatively, searching may begin during a hover mode of the stylus. During the search mode, the stylus may transmit identification requests to a plurality of touch enabled computing devices (block 305). The identification request may be a generic beacon signal that may be recognized by each of the devices or may be an array of identification requests, each configured to be recognized by a different device.

The identification requests may be transmitted based on a defined search protocol stored in the stylus. For example, some identification requests may be transmitted once per frame or more than once per frame while others may be transmitted once every plurality of frames. Optionally, the identification request is the signal picked by the digitizer system and applied to detect coordinates of the stylus. Optionally, the identification request is a signal encoded with information.

The stylus may sample input from its tip in response to the identification requests and process the inputs sampled (block 310). The processing performed may be different for the different computing devices. The different processing may be due to different expected frequencies, modulation and timings of signals transmitted by each of the different computing devices. Based on the processing, a computing device interacting with the stylus may be identified (block 315) and pairing between the stylus and computing device may be established (block 320). The stylus may then proceed to transmit in the configuration that matches the identified computing device and in synchronization with stylus detection periods of the identified computing device.

The stylus may continue to request identification from the identified computing device to confirm the pairing and maintain synchronization with the paired device. A request may be transmitted once per frame. While the stylus is paired with a computing device, the stylus processes the input based on the expected configuration of the paired device. The search for different potential computing devices may be reinitiated after a pre-defined period that the stylus fails to recognize the paired device. Optionally, the search may be reinitiated after a pre-defined period that the stylus fails to recognize the paired device and in response to a newly detected tip down state of the stylus.

Figure 4:
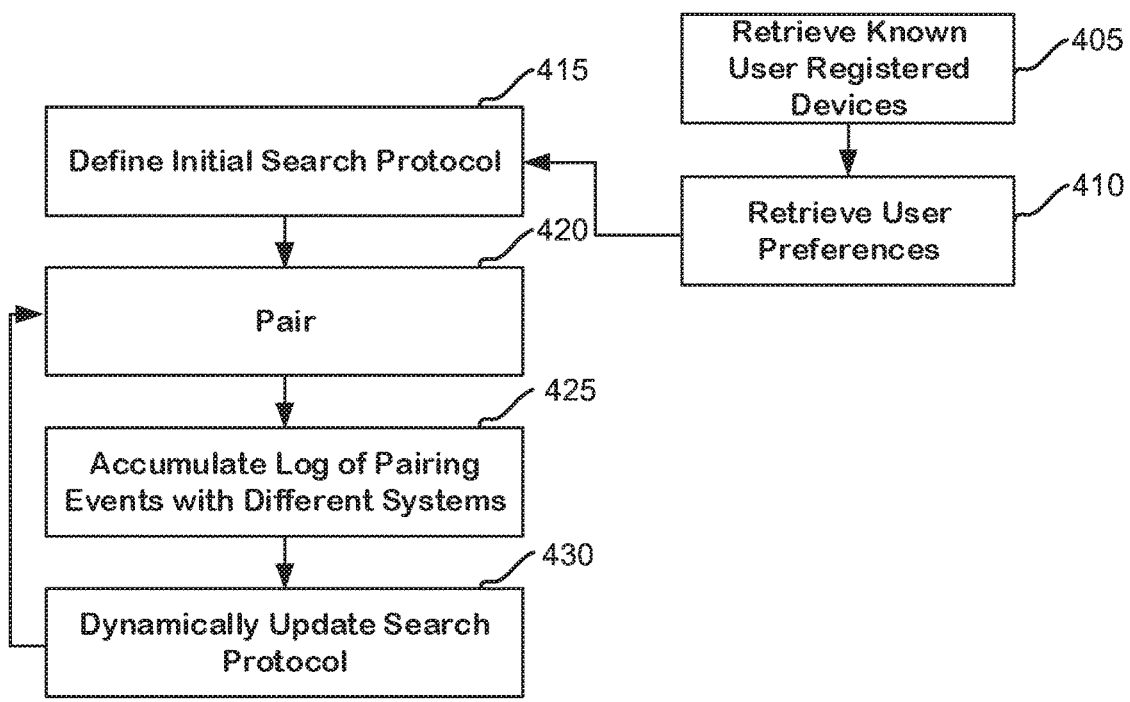
FIG. 4 is a simplified flow chart of an example method for a stylus to dynamically update a search scheme to identify a digitizer system that is communicating with the stylus.

Reference is now made to FIG. 4 showing a simplified flow chart of an example method for a stylus to dynamically update a search protocol to find a digitizer system that is communicating with the stylus. An initial search protocol may be defined and stored in memory included in a stylus (block 415). The initial search protocol may be a protocol defined at the manufacturing site or may be based on a priori information known about a user of the stylus. The information may be one or more of user defined preferences (block 410) and compatible devices known to be owned by the user (block 405). Optionally, the information is transmitted to the stylus during initialization procedure of the stylus and may be periodically updated. Optionally, the information regarding devices owned by the user may be based on accounts that are stored in a cloud memory and detectable by the stylus. Optionally, the information is transmitted during tethered connection of the stylus with a computing device that is being used to initialize the stylus or may be transmitted via wireless connection such as Bluetooth, NFC and RF. Optionally, the initial search protocol defines computing device that is being used to initialize the stylus as a default computing device.

Based on the initial search protocol, the stylus searches for a device with which it is interacting and pairs with the device (block 420). A log of pairing event may be recorded and stored in the stylus. For example, duration and timing of pairing may be stored in the stylus (block 425). Based on this log, the initial search protocol may be adjusted and a new search may be performed (block 430). This process may be repeated each time there is an interruption in the pairing.

Figure 5:
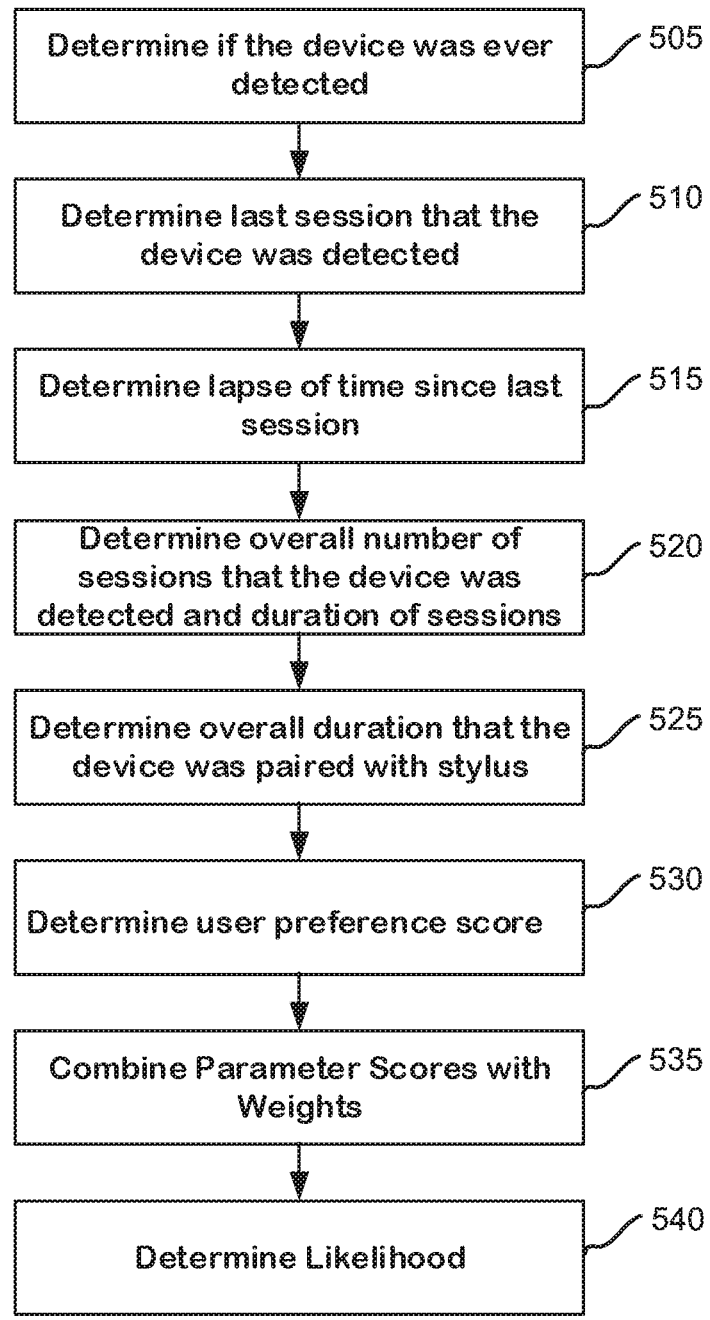
FIG. 5 is a simplified flow chart of an example method for determining a probability of identifying a specific touch enabled computing device with a stylus.

Reference is now made to FIG. 5 showing a simplified flow chart of an example method for determining a probability of identifying a specific touch enabled computing device with a stylus. Probability or likelihood of identifying a specific touch enabled devices may be based on one or more parameters accumulated and stored in stylus 120. Based on the probability determined, a search protocol for that device may be updated.

In some examples, a stylus may determine if the device has ever been detected and use that as a parameter to define a search protocol for the device (block 505). In some examples, a user may not own or have access to some of the devices that are compatible with the stylus and the user may never use the stylus to operate those devices. In some example embodiments, the stylus may identify such devices that have very low probability of being detected and define a search protocol for that device that will expend a relatively small amount of energy and processing time at the expense of relatively slow response time if the device is ever detected.

In cases when the device was detected in the past, the stylus may determine how many sessions ago the device was detected (block 510). A session may be defined herein as a duration over which a tip down state is detected with little or no interruptions. Optionally, a session may begin when a tip down is detected and end when a tip down is interrupted for more than predefined time period, e.g. 250 ms.

In some example embodiments, a lapse of time since the previous session may also be detected (block 515). The lapse of time may be compared to predefined threshold time period it would take a user to move the stylus from one computing device to another. If the lapse of time since the previous session is less than the predefined threshold it may be unlikely that the stylus is now pairing with a different device.

Additional example parameters that may be considered include overall number of sessions that the device was detected (block 520) and overall duration over which the device was paired with stylus (block 525). A reported user preference may also be considered (block 530).

In some example embodiments, a plurality of parameters are combined to determine probability of detecting a particular device (block 540). Optionally, the parameters are combined by weighted averages (block 535). Based on the weighted averages, a stylus may update its search protocol to search more aggressively for devices that have a relatively high probability to be detected and less aggressively for devices that have low probability. While searching aggressively, a stylus may respond quickly to the new device without the user identifying any lag. The cost of receiving the quick response is relatively high expenditure of power and processing time. Less aggressive searching may be accompanied by a certain lag that may be noticeable by the user with the benefit of lower power and processing time expenditure. The cost benefit of response time as opposed to power and processing time expenditure may be balanced based on the detected likelihood.

Figure 6:
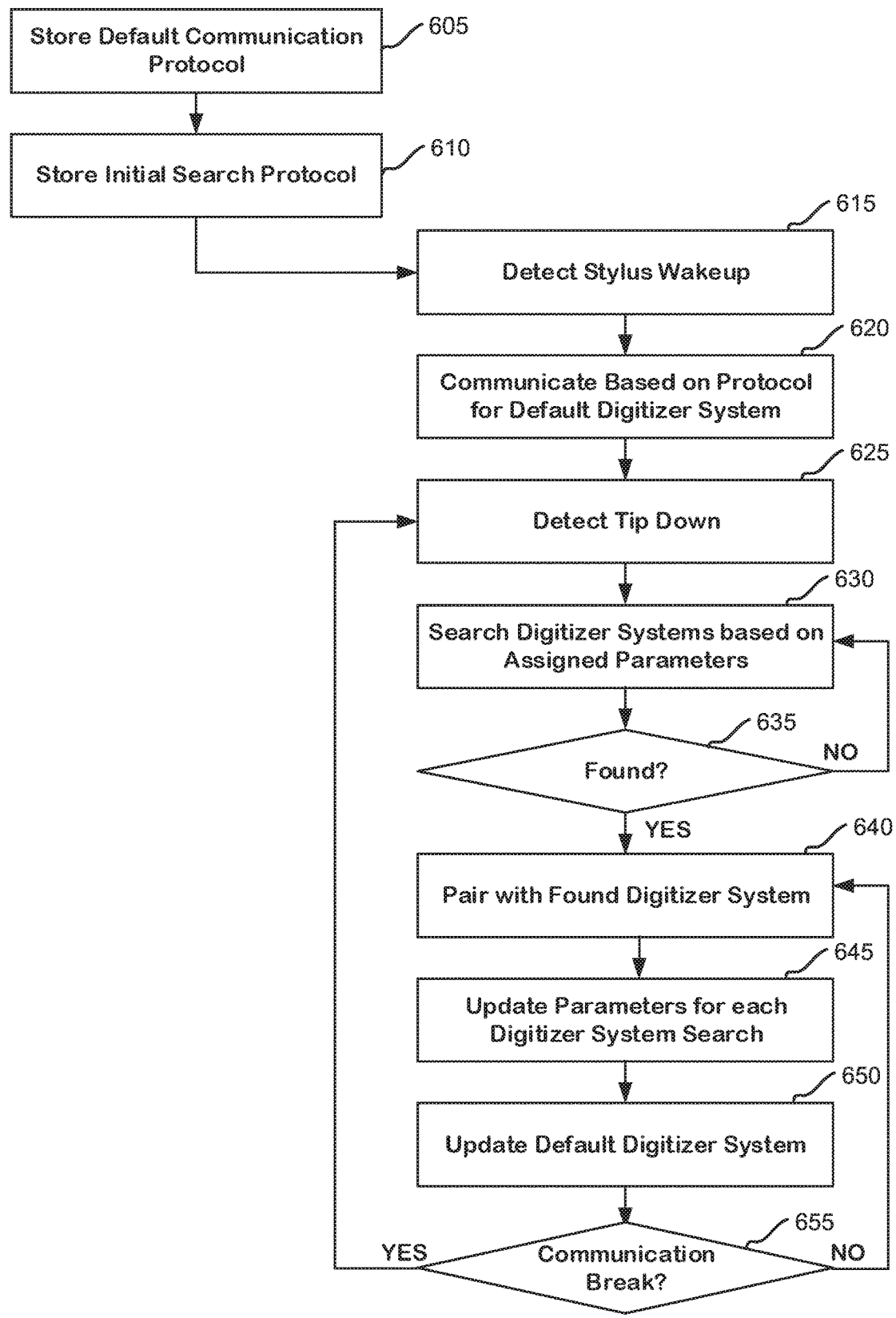
FIG. 6 is a simplified flow chart of an example method for a stylus to switch between pairing with different touch enabled computing devices.

Reference is now made to FIG. 6 showing a simplified flow chart of an example method for a stylus to switch between pairing with different touch enabled computing devices. A stylus may include a sensor to detect stylus wakeup (block 615). Optionally, the sensor is a pressure sensor associated with an interaction tip of the stylus. Prior to wakeup, a default protocol for transmitting may be pre-stored in the stylus (block 605). Optionally, an initial search protocol may also be pre-stored (block 610). The initial search protocol may be based on a priori information regarding a user that owns the stylus or may also be based on data accumulated from previous sessions.

At wakeup, the stylus may communicate based on the default communication protocol (block 620). Searching for a touch enabled computing device may be initiated when detecting a tip down state of the stylus (block 625). During a tip down state, the stylus is close enough to the digitizer sensor to pick uplink signals transmitted by the digitizer system. At this stage, each of a plurality of computing devices may be searched based on the initial search protocol stored in the stylus (block 630). Once a particular device has been identified (block 635), the stylus pairs with the device (block 640) and updates the parameters for subsequent searches (block 645). Optionally, the default protocol may also be updated (block 650). The pairing is maintained until a communication break is detected (block 655). A communication break is typically due to lifting of the stylus away from the digitizer sensor. When the communication break continues for more than a defined duration, it may possible that the stylus is now pairing with a different device.

Figure 7:
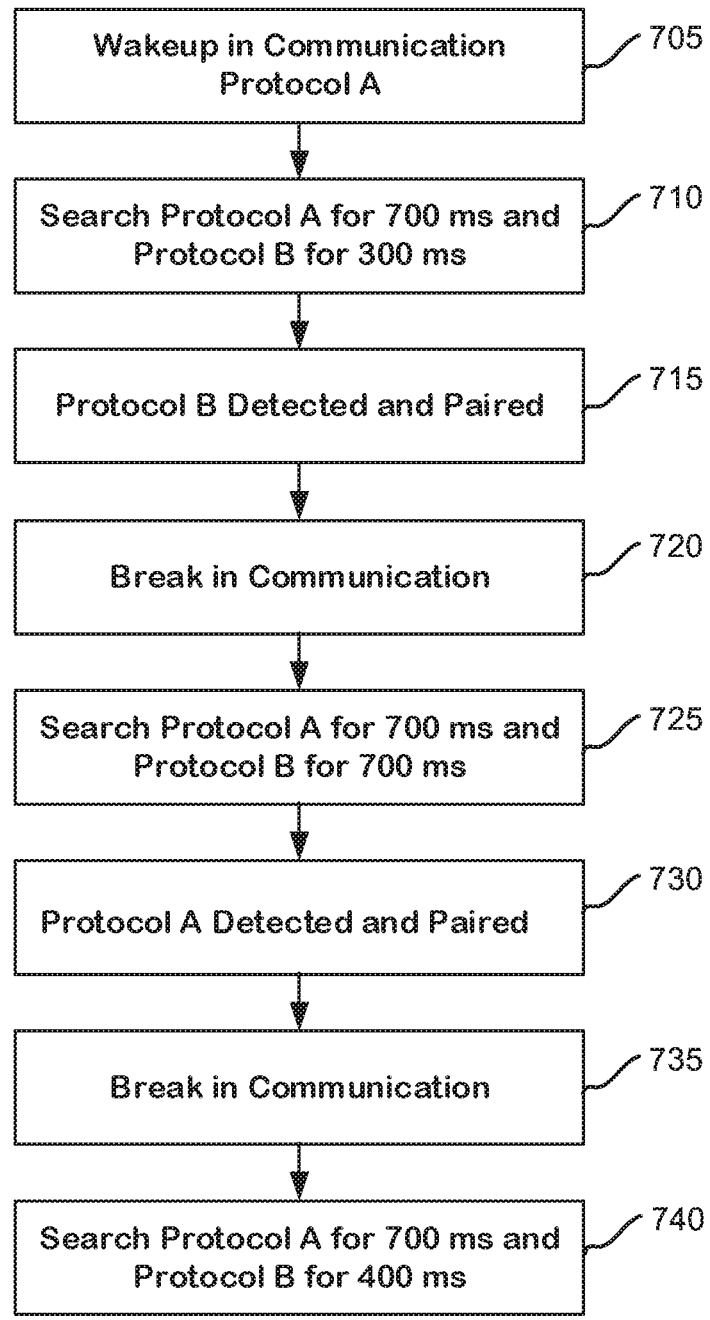
FIG. 7 is a simplified flow chart of one example method to dynamically update a parameter in a search protocol.

Reference is now made to FIG. 7 showing a simplified flow chart of one example method to dynamically update a parameter in a search protocol. A stylus may be configured to wakeup and begin transmissions based on a communication protocol A (block 705). When tip down is detected, stylus may search for protocol A for 700 ms and search for a protocol B for 300 ms (block 710). If protocol B is detected, stylus pairs based on protocol B (block 715). Parameters of the pairing session may be stored in the stylus. In a subsequent break in communication (block 720), the search protocol is updated based on the stored parameters. The stylus may now search for protocol A for 700 ms and protocol B for 700 ms (block 725). The duration over which protocol B is searched for has increased since protocol B has been recently detected.

In the next tip down session, protocol A may be detected and the stylus may pair based on protocol A (block 730). Parameters of the pairing session may be stored in the stylus and applied after a subsequent break in communication (block 735). In the following session, the stylus may search for protocol A for 700 ms and for protocol B for 400 ms (block 740). The duration over which protocol B is searched is reduced since protocol B has not been detected in the previous session.

According to an aspect of some example embodiments, there is provided a method including: storing, while a user is operating a stylus, a log of pairing events between the stylus and each of a plurality of digitizer systems from which the stylus is configured to receive input; defining a search protocol to identify which digitizer system from the plurality of digitizer systems is providing input to the stylus, wherein the search protocol is dynamically defined based on the log; searching for the digitizer system that is communicating with the stylus based the input detected; and transmitting signals from an interacting tip of the stylus using a protocol configured for communicating with the digitizer system identified during the searching.

Optionally, the method includes initiating the searching based on detecting a tip down state of the stylus.

Optionally, the method includes storing user preferences in the stylus and further defining the search protocol based on the user preferences.

Optionally, the method includes receiving information indicating computing devices owned by a user operating the stylus and further defining the search protocol based on the information.

Optionally, the method includes detecting a probability that the digitizer system is communicating with the stylus based on the log and defining a parameter of the search protocol based on the probability detected.

Optionally, the probability is detected based on a plurality of parameters determined from the log.

Optionally, the method includes determining if the digitizer system has ever been identified based on the log and reducing at least one of frequency and duration for searching for the digitizer system based on determining that the digitizer system has never been identified.

Optionally, the method includes determining which digitizer system was previously identified by the stylus and increasing at least one of frequency and duration for searching for that digitizer system.

Optionally, the searching for the digitizer system includes transmitting identification requests to the plurality of digitizer systems.

Optionally, the identification requests are position signals transmitted by the stylus based on which the digitizer system detects coordinates of the stylus.

According to an aspect of some example embodiments, there is provided a stylus including: a circuit configured to: store while a user is operating a stylus, a log of pairing events between the stylus and each of a plurality of digitizer systems from which the stylus is configured to receive input;

define a search protocol to identify which digitizer system from the plurality of digitizer systems is providing input to the stylus, wherein the search protocol is dynamically defined based on the log; search for the digitizer system that is communicating with the stylus based the input detected; and transmit signals from the stylus using a protocol configured for communicating with the digitizer system identified during the searching; and an interacting tip via which the signals from the stylus is transmitted.

Optionally, the stylus includes a tip sensor configured to sense a tip down state of the stylus, and wherein the search is initiated based on detecting a tip down state of the stylus.

Optionally, the circuit is configured to store user preferences and to further define the search protocol based on the user preferences.

Optionally, the stylus is configured to receive information indicating computing devices owned by a user operating the stylus and to further define the search protocol based on the information.

Optionally, the circuit is configured to detect a probability that the digitizer system is communicating with the stylus based on the log and to define a parameter of the search protocol based on the probability detected.

Optionally, the probability is detected based on a plurality of parameters determined from the log.

Optionally, the circuit is configured to determine if the digitizer system has ever been identified based on the log and to reduce at least one of frequency and duration for searching for the digitizer system based on determining that the digitizer system has never been identified.

Optionally, the circuit is configured to determine which digitizer system was previously identified by the stylus and increase at least one of frequency and duration for searching for that digitizer system.

Optionally, the searching for the digitizer system includes transmitting identification requests to the plurality of digitizer systems.

Optionally, the identification requests are position signals transmitted by the stylus based on which the digitizer system detects coordinates of the stylus.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A method comprising:
    storing, while a user is operating a stylus, a log of pairing events between the stylus and each of a plurality of digitizer systems from which the stylus is configured to receive input;
    defining a search protocol to identify which digitizer system from the plurality of digitizer systems is providing input to the stylus, wherein the search protocol is dynamically defined based on the log;
    searching for the digitizer system that is communicating with the stylus based on the input detected, wherein at least one of a frequency and a duration of the searching for the digitizer system is defined by the search protocol; and
    transmitting signals from an interacting tip of the stylus using a protocol configured for communicating with the digitizer system identified during the searching.

2. The method according to claim 1, comprising initiating the searching based on detecting a tip down state of the stylus.

3. The method according to claim 1, comprising storing user preferences in the stylus and further defining the search protocol based on the user preferences.

4. The method according to claim 1, comprising receiving information indicating computing devices owned by a user operating the stylus and further defining the search protocol based on the information.

5. The method according to claim 1, comprising detecting a probability that the digitizer system is communicating with the stylus based on the log and defining a parameter of the search protocol based on the probability detected.

6. The method according to claim 5, wherein the probability is detected based on a plurality of parameters determined from the log including based on a log of past pairing events, stored user preferences and host commands, the log comprising a duration and timing for the past pairing events.

7. The method according to claim 1, comprising determining if the digitizer system has ever been identified based on the log and reducing at least one of frequency and duration for searching for the digitizer system based on determining that the digitizer system has never been identified.

8. The method according to claim 1, comprising determining which digitizer system was previously identified by the stylus and increasing at least one of frequency and duration for searching for that digitizer system.

9. The method according to claim 1, wherein the searching for the digitizer system includes transmitting identification requests to the plurality of digitizer systems.

10. The method according to claim 9, wherein the identification requests are position signals transmitted by the stylus based on which the digitizer system detects coordinates of the stylus.

11. A stylus comprising:
    a circuit configured to:
        store while a user is operating a stylus, a log of pairing events between the stylus and each of a plurality of digitizer systems from which the stylus is configured to receive input;
        define a search protocol to identify which digitizer system from the plurality of digitizer systems is providing input to the stylus, wherein the search protocol is dynamically defined based on the log;
        search for the digitizer system that is communicating with the stylus based on the input detected, wherein at least one of a frequency and a duration of the search for the digitizer system is defined by the search protocol; and
        transmit signals from the stylus using a protocol configured for communicating with the digitizer system identified during the searching; and
    an interacting tip via which the signals from the stylus is transmitted.

12. The stylus according to claim 11, comprising a tip sensor configured to sense a tip down state of the stylus, and wherein the search is initiated based on detecting a tip down state of the stylus.

13. The stylus according to claim 11, wherein the circuit is configured to store user preferences and to further define the search protocol based on the user preferences.

14. The stylus according to claim 11, wherein the stylus is configured to receive information indicating computing devices owned by a user operating the stylus and to further define the search protocol based on the information.

15. The stylus according to claim 11, wherein the circuit is configured to detect a probability that the digitizer system is communicating with the stylus based on the log and to define a parameter of the search protocol based on the probability detected.

16. The stylus according to claim 15, wherein the probability is detected based on a plurality of parameters determined from the log.

17. The stylus according to claim 11, wherein the circuit is configured to determine if the digitizer system has ever been identified based on the log and to reduce at least one of frequency and duration for searching for the digitizer system based on determining that the digitizer system has never been identified.

18. The stylus according to claim 11, wherein the circuit is configured to determine which digitizer system was previously identified by the stylus and increase at least one of frequency and duration for searching for that digitizer system.

19. The stylus according to claim 11, wherein the searching for the digitizer system includes transmitting identification requests to the plurality of digitizer systems, and wherein the identification requests are position signals transmitted by the stylus based on which the digitizer system detects coordinates of the stylus.

20. A computing device comprising:
a memory to store, while a user is operating a stylus, a log of pairing events between the stylus and each of a plurality of digitizer systems from which the stylus is configured to receive input; and
a processing device configured to:
define a search protocol to identify the digitizer system from the plurality of digitizer systems that is providing input to the stylus, wherein the search protocol is dynamically defined based on the log;
search for the digitizer system that is communicating with the stylus based on the input detected, wherein at least one of a frequency and a duration of the searching for the digitizer system is defined by the search protocol; and
transmit signals from an interacting tip of the stylus using a protocol configured for communicating with the digitizer system identified during the searching.

* * * * *